April 27, 1965 W. L. SANBORN 3,180,376
SUPPLY TANK FOR VISCOUS MATERIALS
Original Filed Oct. 25, 1956
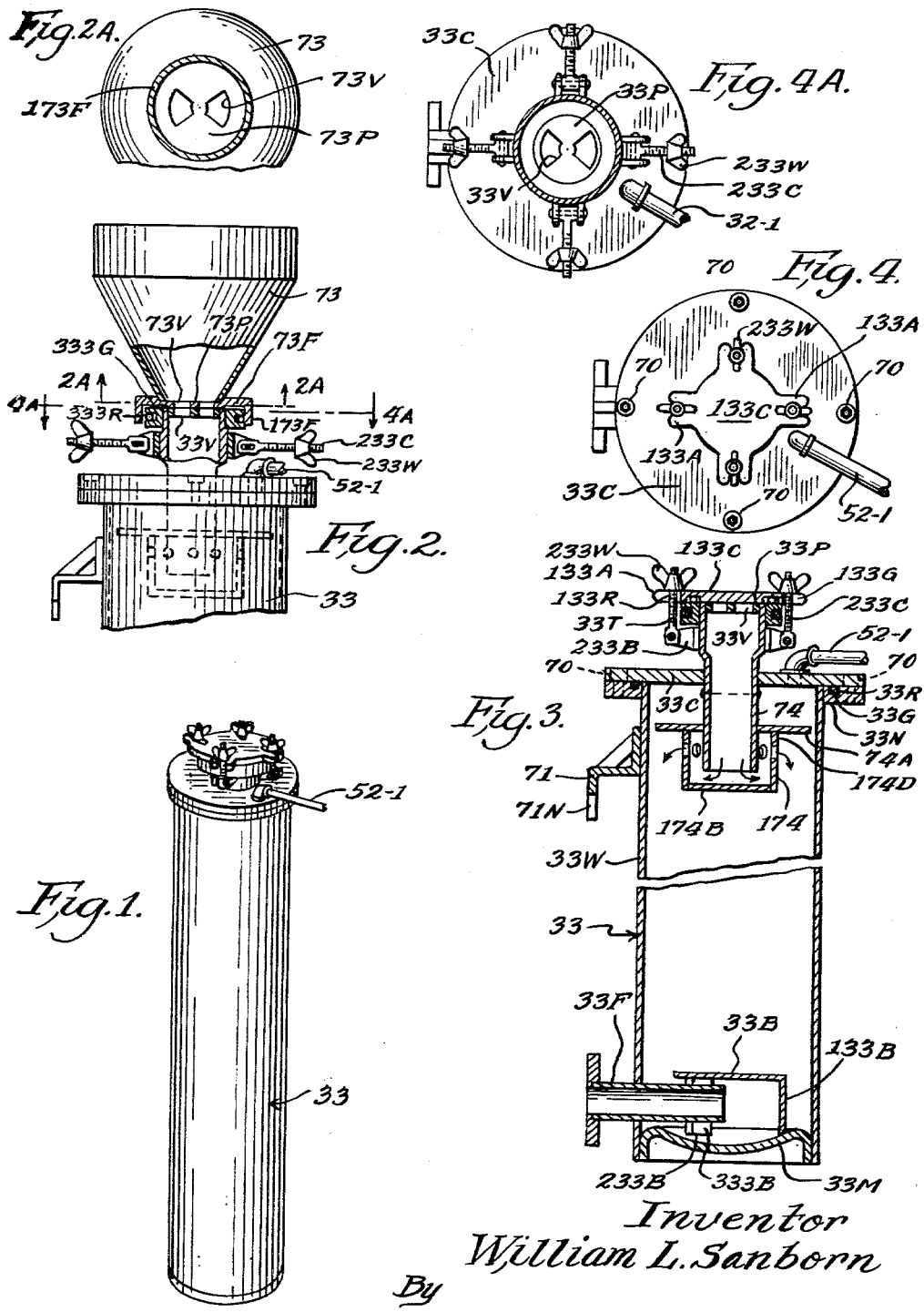
Inventor
William L. Sanborn
By
Mann, Brown & McWilliams
Attys.

United States Patent Office 3,180,376
Patented Apr. 27, 1965

3,180,376
SUPPLY TANK FOR VISCOUS MATERIALS
William L. Sanborn, Milwaukee, Wis., assignor, by mesne assignments, to International Telephone and Telegraph Corporation, New York, N.Y., a corporation of Maryland
Original application Oct. 25, 1956, Ser. No. 618,278, now Patent No. 3,064,307, dated Nov. 20, 1962. Divided and this application Jan. 15, 1962, Ser. No. 169,992
3 Claims. (Cl. 141—363)

This application is a division of my copending application Serial No. 618,278, filed October 25, 1956, now Patent No. 3,064,307 dated November 20, 1962.

This invention relates to proportional blending of viscous substances and more particularly to a supply tank arrangement for receiving such substances from an original packaging drum without encountering excessive air entrapment.

In industry there are many substances where two flowable substances must be blended in predetermined accurate proportions, and while many different types of blending equipment have heretofore been employed the automatic and continuous blending of substances in accurate proportions and with a complete and homogeneous output has not been attained in respect to many substances which require such blending. One outstanding instance of this character is in the blending of synthetic rubber base material with the required accelerator. Such synthetic rubber base materials must be blended with the accelerator in predetermined proportions that are controlled within extremely fine limits, and the blending action must be complete so that there will be the desired uniformity in the final material. An example of such a material is Thiokol, that is made by Thiokol Corporation, and it is noted that while this material is said by some authorities to constitute a resin rather than a synthetic rubber, it nevertheless has the same general properties and its blending involves the same problems and therefore in the present disclosure, the term synthetic rubber is used in a broad sense that is intended to include Thiokol and other thioplasts as well as similar substances. With this particular material as with all synthetic rubbers, the base substance is relatively viscous and must be intimately mixed with an accelerator that has considerably less viscosity. This material is capable of being compounded so as to have uniformly determined characteristics and properties when the material has set up, and because of its resiliency, long life, and other desirable properties, has been used quite extensively as a caulking material in assembling airplane structures, household appliances such as refrigerators, and in various building operations where caulking is required.

Because of the necessity for accurate proportioning and blending of the ingredients of such synthetic rubber materials, it has been the usual practice to blend the materials in a manually performed batch operation. In such operation the ingredients were measured by weighing, and then after these materials were combined in a suitable container, the blending was performed manually by means of a suitable mixing tool such as a paddle or spatula. Such procedure has been considered objectionable from many different standpoints, one of which is that in the mixing operation considerable heat is developed. This heat accelerates the setting of the mixture so that as it is materially reduced the available time after mixing during which the material might be handled and used.

Under prior practice it has been customary to retard the setting action after completion of the manually performed blending operation by loading the mixture into small containers such as the supply cylinder used in caulking guns, and then freezing the mixture in these containers so that they might be stored until needed for use. Then, when the material was to be used, it was thawed and thereafter extruded from a caulking gun into its final position of use.

In the prior practice utilized in blending synthetic rubber materials the requisite accuracy of proportioning of the base material and the accelerator has been attained by weighing the material introduced into each batch. Reliance on weighing as a means of determining the amounts to be mixed together is of course a time consuming operation, and another object of the present invention is to enable materials of this character to be volumetrically metered or measured to attain the desired proportioning in the final mixture.

The base material utilized in synthetic rubber is of such a character that there is a tendency to tray air in the body of the material, and this is found to be particularly troublesome in those instances where the material is being transferred from one container to another. Removal of entrapped air is important in enabling minimum size supply tanks to be used, to enable volumetric metering to be employed, and in assuring uniformity in the product and in its setting and adhesive properties. Such material is usually furnished in small cans or drums, and in order that it may be handled in a volumetric metering system it is necessary to transfer base material from the original drum into some form of continuous feeding mechanism. It is in such transfer that the most serious entrapment of air is encountered, although it is found that even in the original packing of the base material there may be considerable air trapped in the product, and it has been found that there is normally a considerable variation in the amount of air that is thus entrapped.

In the apparatus disclosed herein simple and effective means are provided for eliminating entrapped air from the material during the time the material is being introduced into the supply container of a blending machine.

Other and further objects of the present invention will be apparent from the following description and claims, and are illustrated in the accompanying drawings, which by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without parting from the invention.

In the drawings:

FIG. 1 is a perspective view of the supply tank of this invention;

FIG. 2 is a fragmentary elevational view of the supply tank with parts thereof shown in section;

FIG. 2A is a plan view of the funnel illustrating the portion of the valve or shutoff means that is incorporated therein;

FIG. 3 is a fragmentary vertical sectional view of the supply tank that is used for the most viscous material;

FIG. 4 is a plan view of the top of the tank showing the form of the cover and the cover clamping means; and FIG. 4A is a plan view similar to FIG. 4 and showing portion of the valve or shutoff means that is incorporated in the upper end of the tank.

A base compound tank in accordance with this invention is designated generally at 33 and comprises a main cylindrical wall 33W having a bottom wall or closure wall 33M secured therein as by welding. The tank at its lower end has a horizontal outlet pipe fitting 33F secured therein so as to extend through the side wall 33W, and within the tank this fitting 33F extends substantially to the center line of the tank. About the inner end of the outlet fitting 33F baffle means are provided so as to prevent what may be termed a blow-through of the pressure air. Such baffle means in the present instance comprises a horizontal plate 33B that overlies the inner end of the fitting 33F and extends for a substantial distance toward the side wall 33W. A down-turned portion 133B of this plate extends to the bottom wall 33B and is welded thereto at a point opposite and spaced substantially from the open inner end of fitting 33F. In addition to the foregoing, a flanged wall 233B is positioned about the inlet fitting 33F at a point spaced from the inlet end thereof, and the wall 233B is spaced slightly from the bottom wall 33M and engages the lower face of the baffle 33B. Flanges 333B on the opposite ends of the wall 233B are welded to the baffle 33B and to the bottom wall, thus to serve not only as baffle means but, also in supporting the member 33B. The material must, therefore, flow along a somewhat tortuous path to enter the discharge fitting 33F and this eliminates the possibility of a direct air path being established from the top of the tank through the material to the fitting 33F.

At its upper end the wall 33W has an outwardly extending flange 33N rigidly secured thereto as by welding, and in its upper surface the flange 33N has a groove 33G formed therein to receive a sealing means such as an O ring 33R. The top of the tank 33 is closed by heavy cover 33C that is removably secured in position to flange 33N by a plurality of cap screws 70. The cover 33C may of course be removed when the tank 33 is to be cleaned or inspected. The tank 33 is arranged to be supported on the outer face of a cabinet (not shown) by means of a hanger bracket 71 that is notched at 71N to engage suitable supporting means on the cabinet, and the length of the fitting 33F is coordinated with the dimensions of the bracket 71 so that this fitting may rest against the outer surface of the cabinet.

The cover 33C is arranged under the present invention to carry means that are important in loading highly viscous material to the tank 33, and in the loading of the tank such means cooperate with the vacuum condition that is created in the tank to remove any entraped air in the material as such material is deposited in the supply tank 33. In the loading operation, use is made of a funnel 73 as will be described in some detail hereinafter, and the aforesaid means that are carried by cover 33C are arranged to cooperate with such funnel in the loading operation. Thus the portion of the loading means that are incorporated in or on the cover 33C comprise an axial filling pipe 74 extended through the cover 33C and secured therein as by welding. At its upper end, where the pipe 74 projects upwardly from the cover 33C, outwardly extending flange 33T of substantial cross section is secured to the pipe 74, and across the upper end of the pipe and within the upper portions of the flange 33T, a valve plate 33P is secured as by welding. This valve plate 33P has a pair of diametrically disposed valve openings 33V formed therein, these openings being segmental in character as will be evident in FIG. 4A of the drawings.

When the upper end of the pipe 74 is to be closed, a cover plate 133C is put in position on top of the pipe, this cover being upwardly recessed in the area opposite the plate 33P so that the bordering areas of the plate 133C will bear against the upper surface of the flange 33T. In this bordering area of the lower face of the plate 133C an annular groove 133G is formed to receive an O ring 133R or other suitable sealing means. The plate 133C is clamped downwardly to effect the desired seal, and in the present instance this is accomplished by means of four equally spaced clamping screws 233C. These clamp screws 233C are pivotally mounted at their lower ends in extending arms of a mounting bracket 233B that is secured by welding to the outer surface of the pipe 74 just below the top flange 33T. The clamping screws 233C are arranged to be pivoted from the released positions of FIG. 2 to upright positions wherein they extend through slots in outward clamping arms 133A at the top plate 133C. Wing nuts 233W on the several screws may then be tightened to effect the necessary clamping of the top plate 133C.

Within the tank 33, the lower end of the filling pipe 74 has means associated therewith to form what amounts to a trap so that the direction of advancing movement of the material that is being loaded is changed or reversed as it progresses into the tank 33. In the present instance, this trap structure is provided by fixing a transverse, ring-like plate 74A to the pipe 74 at a position spaced substantially upwardly of the pipe 74. The edges of the plate 74A are spaced from the side walls 33W to provide for free communication between upper and lower portions of the tanks. A relatively large diameter pipe 174 of comparatively short length is welded to the lower surface of plate 74A in concentric relationship to pipe 74 and this short pipe 174 extends downwardly to a point somewhat below the lower end of the pipe 74. The lower end of the pipe 174 is closed by a cross wall 174B. Near its upper end, and substantially above the lower end of the pipe 74, the pipe 174 has a plurality of discharge openings 174D formed therein. Thus when the material flows downwardly through the pipe 74, it must reverse its movement as indicated by the arrow in FIG. 3 and flow upwardly to the discharge opening 174D from which the material is discharged in a generally horizontal direction so that it may fall downwardly to the bottom of the tank 33. This structure therefore serves as a trap, and this trap structure, of course, may readily be removed when the top cover 33C is removed.

When the tank 33 is to be filled, the clamping screws are released and the cap 133C is removed. The filling funnel 73 is then put into position, and it will be noted that the funnel 73 is arranged to have a relatively tight seal in respect to the upper end of the filling pipe 74. Thus, the lower end of the funnel 73 has a lower end fitting 73F secured thereto as by welding and this fitting includes a cross wall 73P in which a pair of segmental valve openings 73V are formed for cooperation with the valve openings 33V as will be described. At its outer portions, the bottom fitting 73F has a downwardly projecting flange 173F that is adapted to snugly embrace the outer edge surface of top flange 33T, and to produce an effective seal between flange 173F and the top flange 33T of the filler pipe, the flange 33T has an outwardly facing annular groove 333G formed therein to receive a compressible sealing means such as an O ring 333R. Hence, when the funnel is put into position, an effectual sealing is provided about the edges of the connection, and by rotation of the funnel 73 about its vertical axis, the plates 73P and 33P are caused to act as a valve so that the filling opening may be completely closed. This is important in order to control the rate of flow of the material, particularly where the materials of different viscosities are to be handled, and it is also important to prevent flow of the material before a proper degree of vacuum has been established within the tanks 33. Thus, in the usual filling operation the filling opening is closed by rotation of the funnel 73, and a compressor (not shown) connected to line 52-I is operated as a vacuum pump until a vacuum of the order of 20 inches of mercury has been established in the tank 33. The vacuum measurement is provided on suitable gauge means (not shown).

When the filling of the tank 33 has been completed the funnel 73 is removed and the cap 133C is put in place.

It will be apparent that the present invention enables viscous materials to be employed in blending operations in such a way that the proportioning may be accomplished by volumetric measuring or metering, and in particular, it will be evident that the present invention enables viscous materials to be loaded into a blending machine in such a way as to eliminate entrapped air from the material, thereby to assure accuracy of metering and proportioning.

Thus while I have illustrated and described a preferred embodiment of my invention it is to be understood that changes and variations may be made by those skilled in the art without departing from the spirit and scope of the appended claims.

I claim:

1. A supply tank for containing viscous material, said tank comprising top, bottom and side walls, a baffled outlet fitting at the lower end of said tank, a filling pipe extended downwardly through said top wall, means carried at the inner end of said filling pipe defining a trap through which materials must flow to enter said tank, a top plate across the outer end of said filling pipe having at least one eccentrically located opening therein adapted to form part of a valve means, a removable cover plate over said top plate, and means for removably securing said cover plate in position to seal said tank.

2. A supply tank for containing viscous material, said tank comprising top, bottom and side walls, a baffled outlet fitting at the lower end of said tank, a filling pipe extended downwardly through said top wall, means carried at the inner end of said filling pipe defining a trap through which materials must flow to enter said tank, a valve plate across the outer end of said filling pipe having at least one eccentrically located opening therein adapted to form part of a valve means, a funnel having a bottom fitting engaging the outer end of said filling pipe in a rotatable relation, and a valve plate carried in said funnel in flat surface engagement with said first mentioned valve plate and having a valve opening therein positioned for cooperation with said first mentioned valve plate to open and close the passage from said funnel to said pipe.

3. A supply tank for containing viscous material, said tank comprising top, bottom and side walls, a baffled outlet fitting at the lower end of said tank, a filling pipe extended downwardly through one of said walls into the upper end of said tank, means carried at the inner end of said filling pipe defining a trap through which materials must flow to enter said tank, a funnel snugly fitted to the outer end of said pipe in rotatable relation, and cooperating valve elements carried respectively by said funnel and said pipe for opening and closing communication between said funnel and said pipe in response to rotation of said funnel.

References Cited by the Examiner

UNITED STATES PATENTS

| 268,665 | 12/82 | Hartwell | 141—331 |
| 416,048 | 11/89 | Brickenstein et al. | 137—577 XR |
| 687,253 | 11/01 | Morgan | 141—351 XR |
| 980,918 | 1/11 | Brousseau | 222—564 XR |
| 2,463,995 | 3/49 | Nielsen | 222—134 XR |
| 2,578,024 | 12/51 | Steinmayer et al. | 141—7 XR |

FOREIGN PATENTS 83,496   5/54   Norway.

LAVERNE D. GEIGER, *Primary Examiner.*
LOUIS J. DEMBO, *Examiner.*